United States Patent Office 3,600,131
Patented Aug. 17, 1971

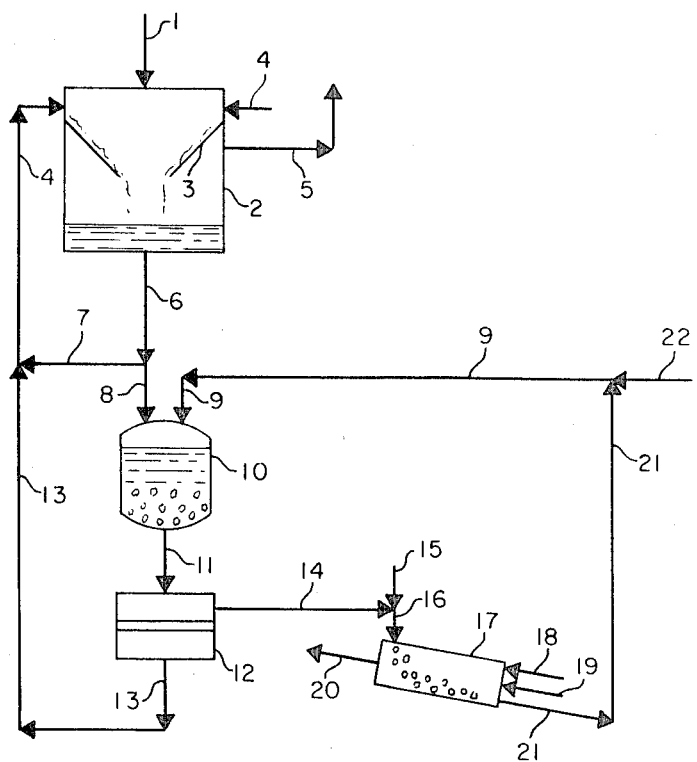

3,600,131
REMOVAL OF SULFUR DIOXIDE FROM WASTE GASES
Indravadan S. Shah, Forest Hills, N.Y., assignor to Chemical Construction Corporation, New York, N.Y.
Filed Jan. 27, 1969, Ser. No. 794,200
Int. Cl. C01b 17/00, 17/48
U.S. Cl. 23—224
2 Claims

ABSTRACT OF THE DISCLOSURE

A process is provided to efficiently and economically absorb and recover the sulfur dioxide content of waste gas streams, and thus eliminate air pollution and produce a useful sulfur-containing product. Sulfur dioxide is recovered from a waste gas stream, such as the flue gas from a steam power boiler which burns a sulfur-containing fuel such as coal, by scrubbing the waste gas stream with an aqueous solution containing sodium sulfite and sodium bisulfite. Sulfur dioxide is absorbed into the aqueous scrubbing solution and reacts with sodium sulfite to form further sodium bisulfite in aqueous solution. The resulting solution is divided into a first portion and a second portion. Magnesium oxide or hydroxide is added to the first portion to convert sodium bisulfite to sodium sulfite and precipitate solid magnesium sulfite, which is filtered or otherwise separated from the solution and processed to recover a valuable sulfur-containing product, such as by calcining to produce a gas stream rich in sulfur dioxide or elements sulfur vapor, or by oxidizing to magnesium sulfate product. The residual solution is combined with the second scrubbing solution portion, and the combined solution is recycled for further waste gas scrubbing.

BACKGROUND OF THE INVENTION

Field of the invention

The invention relates to the removal and recovery of sulfur dioxide from waste gas streams, in order to prevent air pollution and to recover a valuable sulfur-containing product. The invention is typically applicable to the waste flue gas generated by the combustion of a sulfur-containing fuel, such as the flue gas discharged by a coal-burning steam power plant. The invention is also applicable to the tail gas from a sulfuric acid production facility, in which case the recovered sulfur dioxide contained in the gas stream produced by calcining of magnesium sulfite will generally be recycled to the sulfuric acid production facility, to produce further sulfuric acid product.

Description of the prior art

At present, the flue gases leaving a power plant or sulfuric acid plant stack are a major source of air pollution due to the presence of sulfur dioxide. The processing of waste gas streams to remove and recover sulfur dioxide is described in U.S. Pats. Nos. 1,212,199; 2,086,379 and 2,090,142. Disclosure relative to processing involving sulfite solutions include U.S. Pats. Nos. 2,210,405; 2,375,786; 2,413,321 and 3,085,858; and U.S. patent application No. 737,186 filed June 14, 1968.

SUMMARY OF THE INVENTION

In the present invention, sulfur dioxide is recovered from waste gases by scrubbing the gas stream with an aqueous absorbent solution containing sodium sulfite, which results in the in situ formation of sodium bisulfite. The sodium bisulfite is reacted with magnesium oxide or hydroxide, which converts the sodium bisulfite to dissolved sodium sulfite, with concomitant precipitation of solid magnesium sulfite. The solid magnesium sulfite is separated from the residual solution, which is recycled to gas scrubbing, and the solid magnesium sulfite is processed to produce a valuable sulfur-containing product such as magnesium sulfate, elemental sulfur, liquid sulfur dioxide, sulfuric acid or the like. The process of the present invention removes up to 99% or more of the sulfur dioxide from flue gas or other waste gas by absorption. Fly ash is also simultaneously scrubbed from the flue gas. The flue gas leaving the absorption system and discharged to the atmosphere is essentially free of sulfur dioxide and fly ash, and does not cause an air pollution problem.

The system of the present invention provides several important advantages. Essentially all of the sulfur dioxide is removed from the waste gas stream, since aqueous sodium sulfite solution has a strong ability to absorb and retain sulfur dioxide as bisulfite. When the waste gas is a flue gas, entrained solids such as fly ash are also removed. Thus, air pollution is curtailed and prevented. The chemicals cost for the process is essentially negligible, since in a preferred embodiment, all of the magnesium oxide is recovered. The sulfur dioxide is regenerated in a concentrated form, suitable for the preparation of liquid sulfur dioxide or sulfuric acid, or in an alternative embodiment elemental sulfur or magnesium sulfate may be prepared.

It is an object of the present invention to provide an improved process for the removal of sulfur dioxide from a waste gas stream.

Another object is to provide a process for the removal of sulfur dioxide and fly ash from a flue gas stream.

A further object is to provide a process for recovering sulfur dioxide in concentrated form from waste gases containing a small proportion of sulfur dioxide.

An additional object is to prevent the pollution of the atmosphere by waste gases containing sulfur dioxide.

Still an other object is to provide a process for recovering sulfur dioxide from waste gas streams which has a negligible cost and requirement for chemicals for the process.

Still a further object is to provide an improved process for scrubbing sulfur dioxide from waste gas streams using an aqueous absorbent solution containing sodium sulfite.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented. The waste gas stream 1, containing sulfur dioxide and inerts such as nitrogen and carbon dioxide, is passed into the upper end of the venturi-type gas scrubber 2, which is typically provided with an internal inverted frusto-conical baffle 3. Scrubbing liquor stream 4, consisting of an aqueous sodium sulfite-bisulfite solution, is passed into unit 2 above and adjacent to the upper end of baffle 3, and the scrubbing liquor flows downwards on the upper surface of baffle 3 as a thin liquid film. The waste gas stream is accelerated to a high velocity by the converging passage defined by baffle 3, and the thin liquid film flowing downwards on baffle 3 is projected into the high velocity gas stream at the lower opening in baffle 3. The liquid phase is thus dispersed into small droplets which are dispersed into the gas stream and absorb substantially all of the sulfur dioxide from the gas stream. The absorbed sulfur dioxide reacts with sodium sulfite in the liquid phase to form further sodium bisulfite, while the scrubbed gas phase, now substantially free of sulfur dioxide, is removed from unit 2 via stream 5, which may be safely discharged to atmosphere without causing air pollution.

The liquid phase which collects in the bottom of unit 2 now consists essentially of an aqueous sodium bisulfite solution, which may also contain residual dissolved sodium sulfite. The liquid phase is withdrawn from unit 2 via stream 6, which is divided into recycle stream 7 and stream 8, which is subjected to reaction with stream 9 in reaction tank 10. Stream 9 contains magnesium oxide or magnesium hydroxide, and stream 9 reacts with the sodium bisulfite content of stream 8 in unit 10 to form sodium sulfite in solution and to precipitate solid magnesium sulfite. The resulting slurry stream 11 discharged from unit 10 contains an aqueous solution phase consisting of sodium sulfite solution, together with solid magnesium sulfite. Slurry stream 11 is passed through filter or centrifuge unit 12, and the resulting clear aqueous sodium sulfite solution phase discharged from unit 12 via stream 13 is combined with stream 7 to form stream 4.

The solid magnesium sulfite stream 14, which is also discharged from unit 12, is now preferably combined with solid carbon stream 15, which may consist of pulverized coal or coke. The combined solids stream 16 is passed into rotary kiln or calciner 17, which may be externally heated or preferably internally heated to a temperature typically in the range of 400° C. to 900° C. by the combustion of fluid hydrocarbon fuel stream 18 with combustion air stream 19. The resulting off-gas stream 20 discharged from unit 17 contains elemental sulfur vapor, which is recovered from stream 20 as a product of the process by cooling stream 20 to selectively condense liquid sulfur, or by scrubbing stream 20 with a suitable sulfur solvent, or by other suitable means.

The processing in unit 17 thus liberates elemental sulfur from the magnesium sulfite, which is converted to solid magnesium oxide, with the resultant product solid magnesium oxide being discharged from unit 17 via stream 21. The solid magnesium oxide stream 21 is now preferably combined with make-up stream 22, which may consist of water, further magnesium oxide or magnesium hydroxide, and the resulting combined stream 9 is utilized as described supra.

Numerous alternatives within the scope of the present invention wil occur to those skilled in the art. Other types of gas-liquid contact apparatus or devices may be employed instead of the venturi contactor as unit 2. Thus, unit 2 may in practice consist of a spray tower, packed tower or the like. In instances when stream 1 is a flue gas or other waste gas stream containing entrained solid particles such as fly ash, the solid particles will be entrained in the liquid phase in unit 2 and removed via stream 6. In this case, stream 6 may be filtered to remove entrained solid particles by passing stream 6 through a suitable filter or centrifuge similar to unti 12, prior to further processing via streams 7 and 8. A suitable stirrer or agitation device may be provided in unit 10, which may in practice consist of any suitable liquid-solids mixer. Unit 12 may consist of any suitable filter or centrifuge, and the solids stream 14 discharged from unit 12 may be dried by contact with a hot drying gas such as heated air or the like, prior to passing into unit 17. In one alternative embodiment of the invention, stream 15 may be omitted, in which case stream 20 would consist of a gas stream rich in sulfur dioxide, which may be recovered as liquid sulfur dioxide by compressing and cooling stream 20, or in the alternative stream 20 may be passed to a sulfuric acid production facility for conversion to sulfuric acid. In a further alternative embodiment of the invention, stream 14 may be oxidized to magnesium sulfate in a high temperature fluid bed reactor or the like, in which case the magnesium sulfate would be a product of the process, and unit 17 and streams 15 and 21 would be omitted. In this case, stream 9 would be derived solely from make-up stream 22. Finally, in some cases such as when stream 1 is derived from a power boiler or the like, stream 1 may contain a small proportion of sulfur trioxide. In this case, streams 6 and 8 will contain dissolved sodium sulfate, and unit 10 will convert the sodium sulfate content of stream 8 to solid magnesium sulfate, which will be removed via stream 14 and processed to elemental sulfur vapor and magnesium oxide in unit 17.

An example of an industrial application of the process of the present invention will now be described.

Example

The process of the present invention was applied to the bone dry off-gas derived from a sulfuric acid production facility, which consisted primarily of nitrogen and oxygen together with residual sulfur dioxide. Following are the temperatures and component flow rates or concentrations for principal process streams.

| Stream No. | Temp., °C. | Component | Flow rate or concentration |
| --- | --- | --- | --- |
| 1 | 76 | Total off-gas | 1,272 standard cu. meters/min. |
| 1 | | Sulfur dioxide | 5,000 parts per million. |
| 5 | 29 | Total scrubbed gas | 1,360 standard cu. meters/min. |
| 5 | | Sulfur dioxide | 75 parts per million. |
| 4 | 29 | Total stream | 7,850 liters/minute. |
| 8 | | do | 603 kilograms/minute. |
| 8 | | Sodium bisulfite | 56.2 kilograms/minute. |
| 14 | | Hydrated magnesium sulfite | 57.1 kilograms/minute. |
| 14 | | Magnesium oxide | 1.04 kilograms/minute. |
| 9 | | do | 11.8 kilogram/minute. |
| 15 | | Carbon | 3.63 kilograms/minute. |
| 21 | | Magnesium oxide | 11.6 kilograms/minute. |
| 22 | | do | 0.2 kilograms/minute. |
| 20 | 980 | Sulfur | 8.6 kilograms/minute. |

I claim:

1. A process for the recovery of sulfur dioxide from a waste gas stream containing sulfur dioxide which comprises scrubbing said waste gas stream with an aqueous solution containing dissolved sodium sulfite and sodium bisulfite, whereby sulfur dioxide is absorbed into said aqueous solution and at least a portion of the sodium sulfite is converted to sodium bisulfite, dividing the resulting solution principally containing dissolved sodium bisulfite into a first portion and a second portion, adding an alkaline compound selected from the group consisting of magnesium oxide and magnesium hydroxide to said first solution portion, whereby sodium bisulfite is converted to sodium sulfite in solution and solid magnesium sulfite is precipitated, separating the solid magnesium sulfite from the residual solution containing sodium sulfite, adding said residual solution to said second portion of said resulting solution to form a combined solution, recycling said combined solution for further waste gas scrubbing as said aqueous solution containing dissolved sodium sulfite and sodium bisulfite, and processing said separated solid magnesium sulfite to recover a sulfur-containing product and regenerate said alkaline compound by reacting said solid magnesium sulfite with elemental free carbon at elevated temperature in the range of 400° C. to 900° C. to form solid magnesium oxide and an off-gas stream containing elemental sulfur vapor, recovering product elemental sulfur from said off-gas stream, and recycling said solid magnesium oxide for addition to said first solution portion.

2. The process of claim 1, in which said waste gas stream contains entrained solid particles, said solid particles are entrained into said aqueous solution during the scrubbing of said waste gas stream, and the resulting solution is processed to remove entrained solid particles prior to dividing said resulting solution into a first portion and a second portion.

References Cited

UNITED STATES PATENTS

| | | | |
|---|---|---|---|
| 1,969,769 | 8/1934 | Sweet et al. | 23—201X |
| 2,161,056 | 6/1939 | Johnstone et al. | 23—178X |
| 2,922,735 | 1/1960 | Johnstone | 23—178X |
| 3,111,378 | 11/1963 | Mugg | 23—129X |
| 3,148,950 | 9/1964 | Mugg | 23—186X |
| 3,438,733 | 4/1969 | Grantham et al. | 23—224 |

OSCAR R. VERTIZ, Primary Examiner

C. B. RODMAN, Assistant Examiner

U.S. Cl. X.R.

23—2, 178